Jan. 5, 1926.  1,568,065
R. GUNN
CONSTANT FREQUENCY SOURCE
Filed June 9, 1923
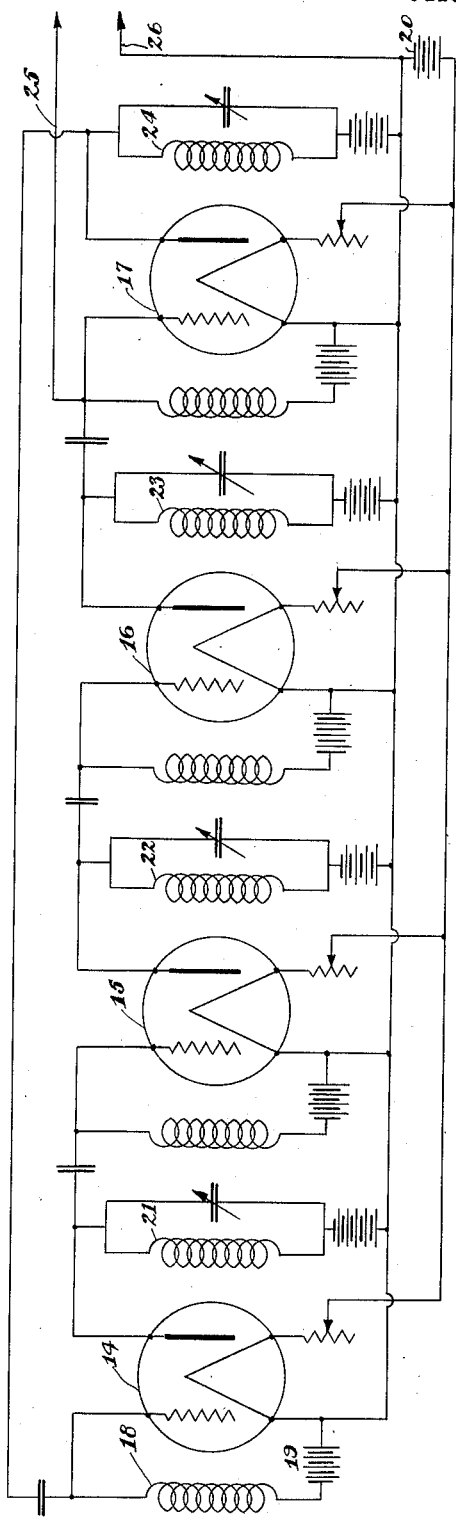
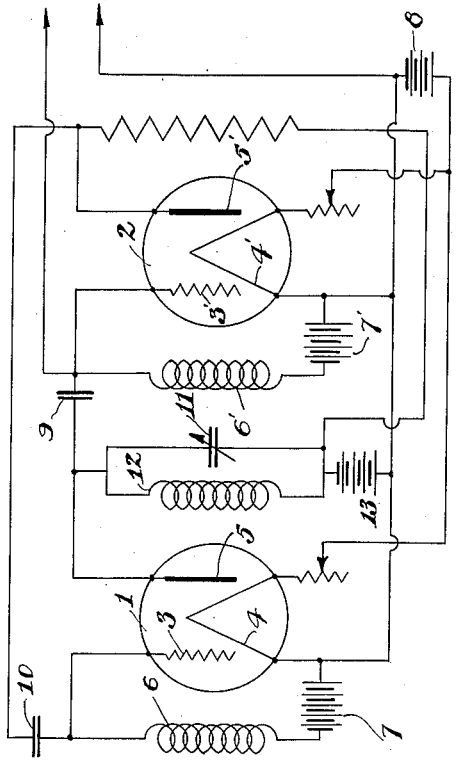
Fig. 2.
Fig. 1.
INVENTOR
Ross Gunn
BY Robert H. Young
ATTORNEY Patented Jan. 5, 1926.

1,568,065

UNITED STATES PATENT OFFICE.

ROSS GUNN, OF DAYTON, OHIO.

CONSTANT FREQUENCY SOURCE.

Application filed June 9, 1923. Serial No. 644,441.

*To all whom it may concern:*

Be it known that I, Ross Gunn, a citizen of the United States, residing at Dayton, in the county of Montgomery and State of Ohio, have invented certain new and useful Improvements in Constant Frequency Sources, of which the following is a specification.

This invention relates to electrical systems for the generation of high frequency oscillations of a constant frequency and one object is to provide a system of this type which will generate and maintain a constant single frequency, any other undesired oscillations of different frequencies being suppressed. A second object is to provide a system in which the frequency of the generated oscillations is not dependent upon the plate voltage or filament currents of the vacuum tubes used in the system.

Further objects will be more fully set forth in the attached description and claims.

Referring to the drawings—

Fig. 1 is a diagram of one arrangement of my invention in which two vacuum tubes are used, and Fig. 2 is a diagram of a preferred form using four tubes.

The arrangement as shown in Fig. 1, embodies two vacuum tubes 1, 2; tube 1 having a grid 3, filament 4, and plate 5; and tube 2 having grid 3', filament 4' and plate 5'.

The grid 3 is connected to a grid choke or inductance 6, which is connected to a suitable source of potential 7. The source of potential 7 is connected to one side of the filament 4 as shown, and a circuit is thus provided for the tube 1, for maintaining the average grid potential at some definite value, preferably a negative value. A similar circuit is also provided for tube 2 by the inductance 6' and battery 7'.

The filament 4 of the tube 1 is connected as shown to a battery 8 and a variable resistance, the battery 8 also serving as a filament battery for the tube 2. To the plate 5 of tube 1 is connected the grid potential maintaining circuit of the tube 2 through the condenser 9; so that the output circuit of the tube 1 is electrically connected to energize the tube 2. The plate 5' of tube 2 is likewise connected to the grid potential maintaining circuit of the tube 1 through a grid stopping condenser 10 of proper value for the frequency used. It will thus be seen that each tube stands in a similar relation to the other, each tube receiving and amplifying the oscillations received from the other tube and each tube exciting the other.

The oscillations produced by a tube are not all of the same frequency but have various frequencies, and as it is desired to produce oscillations of a single frequency, the output circuit of tube 1 is also connected to a control circuit which will in effect, short circuit all oscillations except those of the single frequency desired, and prevent the oscillations of the undesired frequencies from being fed to the other tube and re-amplified by it. This control circuit consists of a condenser 11 which is preferably variable, and an air core inductance 12 connected in parallel with the condenser 11, the condenser and inductance forming a variable impedance, in series with a plate battery 13 connected as shown to the filament circuit. The impedance of the condenser-inductance combination is very high, for the natural frequency of the combination and oscillations of such frequency will therefore not be provided a path through the control circuit and will pass on to be received and amplified in the tube 2. Any other oscillations except those of the natural frequency of the control circuit will be provided an easy path by the control circuit, as the impedance of the condenser-inductance combination is low for all frequencies except the natural one. The undesired oscillations will therefore be strained out or short-circuited and will be prevented from passing on to the tube 2. Practically single frequency oscillations will therefore be produced regardless of small changes in plate voltages or filament currents and the system may be connected to govern any device which is to be furnished oscillations of a single definite unvarying frequency.

The arrangement as set forth in Fig. 1 will not, however, result in a complete elimination of undesired frequencies as a small portion of these undesired oscillations will be passed on to tube 2, and in order to obtain a more perfect elimination of undesired frequencies, I provide a system as shown in Fig. 2, in which four tubes are used and in which a control circuit is provided for the output circuit of each tube. The grid of the tube 14 is connected to an inductance 18 and battery 19, which, together with the filament forms a circuit for maintaining the average grid potential at some definite negative value. A similar circuit is provided for each of the tubes 15, 16, and 17. The plate of each of the tubes 14, 15, 16, and 17 is connected to the grid of the succeeding tube so that the output of each tube is connected to feed the succeeding tube, the last tube being connected to feed the first tube. Each filament is connected to a filament battery 20. Each output circuit is supplied with an exactly similar control circuit, the tubes 14, 15, 16 and 17 having control circuits designated generally 21, 22, 23, and 24 respectively, each control circuit having a condenser and an inductance, one of which may be varied to regulate the frequency of the generated oscillations.

The control circuits are all adjusted for any particular frequency desired so that the natural frequency of the condenser-inductance combination of all of the control circuits is the same. With such an adjustment an indefinite number of paths are provided in which undesired oscillations may attenuate themselves, while the main oscillation is preserved and amplified giving a practically constant frequency. The frequency of these oscillations generated may be changed by changing the natural frequency of each of the control circuits, so that the control circuits in their adjusted relation will still all have equal natural frequencies. A change in plate voltage or filament current in any tube will not vary the generated main frequency for any setting of the control circuits. Neither will a difference in plate voltage nor filament currents in the different tubes have any effect on the desired constant frequency of the main oscillations.

In the arrangement as just described each tube stands in exactly the same relation to the others and each control circuit also stands in exactly the same relation to the system as the other control circuits. It will be obvious that more than four tubes may be used if extreme accuracy is desired. The system is connected to any device or apparatus to which it is desired to supply oscillations of a single constant frequency by connections 25 and 26 which are connected across any of the output circuits of the tubes.

I claim:—

A system for the generation of high frequency oscillations of a predetermined single frequency comprising a plurality of vacuum tubes exceeding two in number, each tube having a plate, a grid and a filament, a circuit for each tube for maintaining the average grid potential at some definite negative value, an output circuit from the plate of each tube electrically connected to energize the grid of another of said tubes, and a plurality of exactly similar control circuits one for each of said output circuits connected across the same for determining the frequency of the oscillations produced by the system irrespective of plate voltage or filament currents, each said control circuits having an adjustable impedance comprising an inductance and a condenser connected together, in parallel arrangement.

In testimony whereof I affix my signature.

ROSS GUNN.